Aug. 26, 1969  F. R. BAYLES  3,463,055
FLUID ACTUATOR

Filed Dec. 2, 1966  2 Sheets-Sheet 1

FRED R. BAYLES
INVENTOR

BY *Harold E. Meier*

ATTORNEY

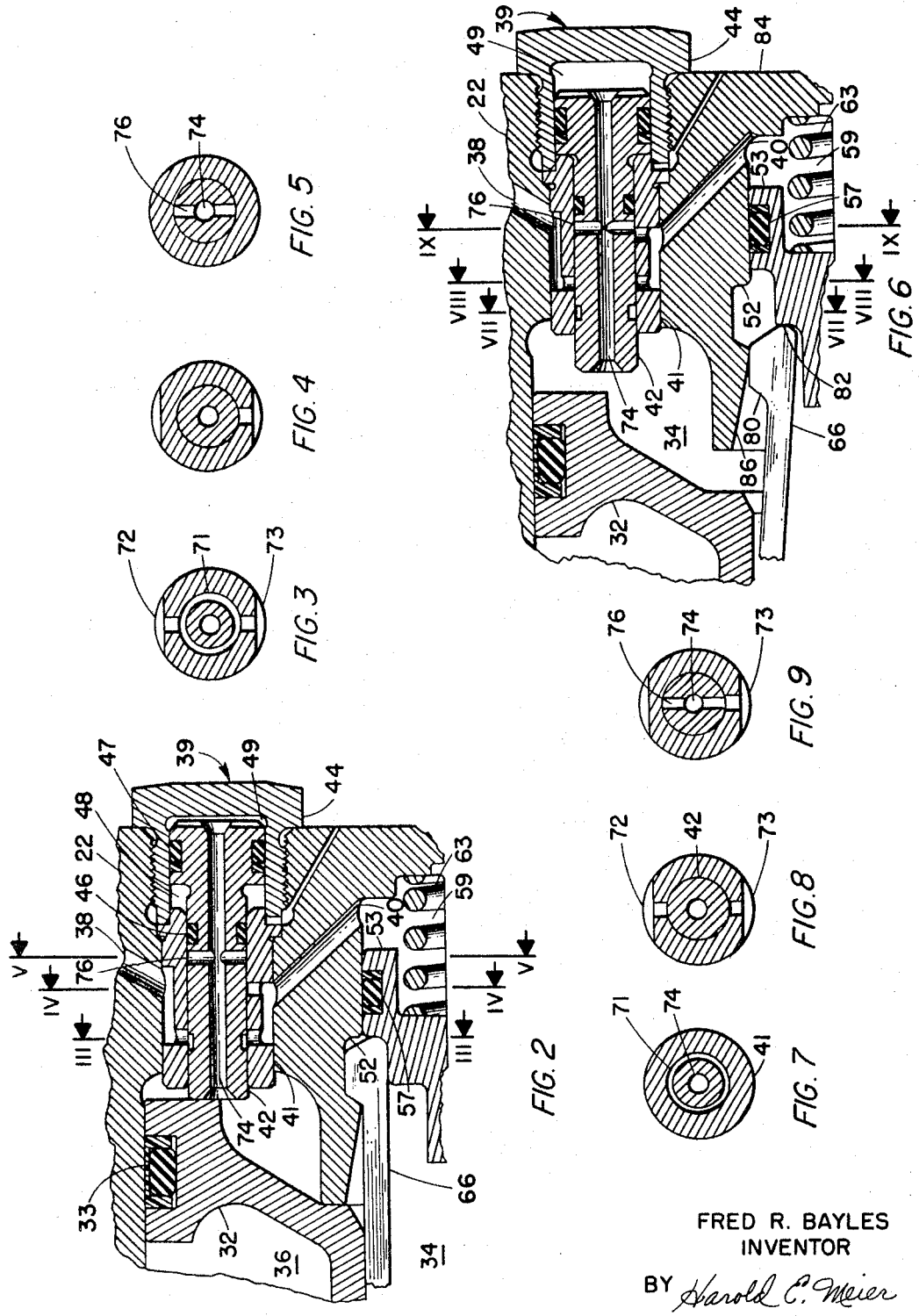

United States Patent Office 3,463,055
Patented Aug. 26, 1969

1

3,463,055
FLUID ACTUATOR
Fred R. Bayles, Dallas, Tex., assignor to LTV Electrosystems, Inc., Greenville, Tex., a corporation of Delaware
Filed Dec. 2, 1966, Ser. No. 598,695
Int. Cl. F15b 15/26
U.S. Cl. 92—26                                           3 Claims

ABSTRACT OF THE DISCLOSURE

A double-acting hydraulic actuator having finger locks to restrain the piston in the retracted position, and an internally mounted slider valve for affecting the movement of a locking piston to selectively hold the finger locks in their locking position.

---

This invention relates generally to a locking device for a fluid actuator and more particularly to a new and improved locking device adapted for use in a fluid actuator and similar mechanisms to prevent axial motion between two axially movable members.

Fluid actuators are well known devices and are used for a wide variety of functions such as opening and closing valves, positioning control surfaces on airplanes and guided missiles, opening and closing furnace dampers, and many similar operations. A serious disadvantage of many known fluid actuators is their inability to remain in a given position when a surge pressure develops in some other part of the fluid system of which they are a part. To overcome this disadvantage many locking mechanisms have been devised. Unfortunately, most of these so called locking devices are themselves subject to a similar shortcoming. Namely, they allow the main actuator piston to unlock since they themselves respond to momentary pressures developed in some remote part of the system of which they are a part.

Many presently available fluid actuators include a spring-loaded locking piston to hold a finger-lock mechanism that is attached to the main piston. The locking piston is designed to hold the finger-lock mechanism in a locked position until a fluid pressure is applied to said piston that overcomes the retaining spring force. With these systems, a transient pressure developed by movement of some other hydraulic actuator in the system can accidentally unlock the fingers and allow the main piston to move from its locked position. Thus, an object of this invention is to provide a fluid actuator having a locking mechanism that is immune to transient pressure variations.

Another object of this invention is to provide a fluid actuator having a positive locking system.

A further object of this invention is to provide a fluid actuator locking mechanism that maintains substantially equal pressures on both sides of the locking piston.

Other objects and advantages will be apparent from the specification and claims and from the accompanying drawing illustrative of the invention.

In the drawing:

FIGURE 2 is a schematic cross-section of the unloading valve of the actuator of FIGURE 1 when the piston is in the fully retracted position.

FIGURE 3 is a cross section of the slider valve of FIGURE 2 taken along the line III—III.

FIGURE 4 is a cross section of the slider valve of FIGURE 2 taken along the line IV—IV.

2

Figure 1:
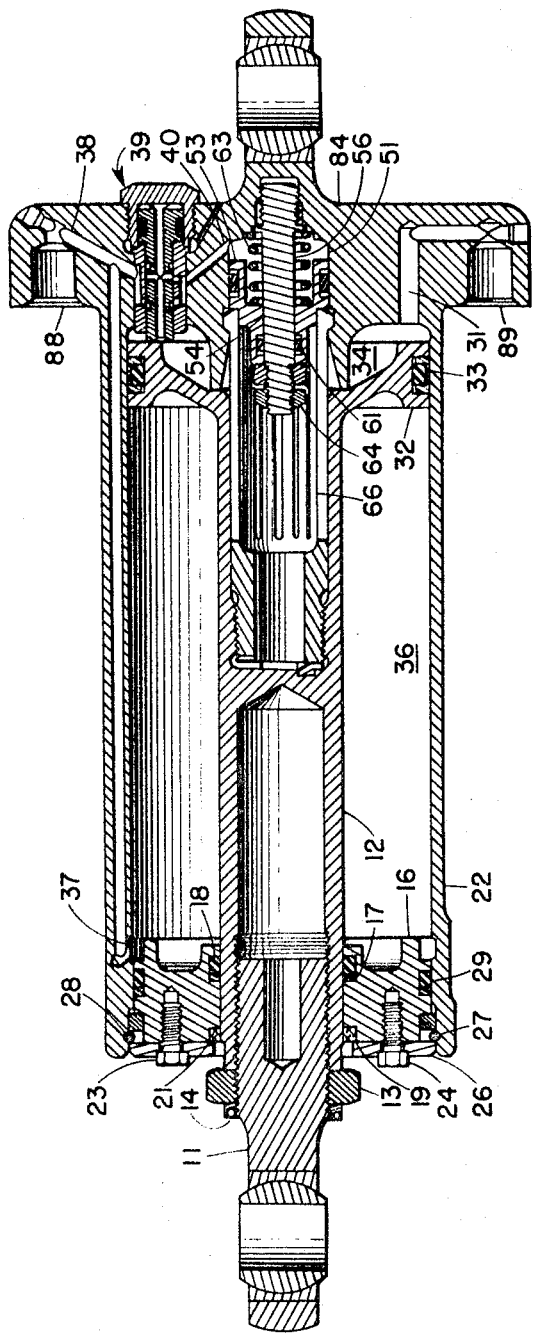
FIGURE 1 is a schematic cross-section of a fluid actuator having a finger locking mechanism and an unloading valve.

FIGURE 5 is a cross section of the slider valve of FIGURE 2 taken along the line V—V.

FIGURE 6 is a cross section of the unloading valve of the actuator of FIGURE 1 when the piston is in the fully extended position.

FIGURE 7 is a cross section of the slider valve taken along the line VII—VII of FIGURE 6.

FIGURE 8 is a cross section of the slider valve of FIGURE 6 taken along the line VIII—VIII.

FIGURE 9 is a cross section of the slider valve of FIGURE 6 taken along the line IX—IX.

Referring to FIGURE 1, there is shown an actuator rod 11 coupled to a piston rod 12 and locked in place by means of a locking nut 13 and a locking device 14. The piston rod 12 passes through an opening in a pressure cap 16 having an inner circumferential groove 17 around said opening. Assembled in the groove 17 is an O-ring seal 18 for preventing leakage of operating fluid and pressure during movement of the piston rod 12 through said opening. The opening in the pressure cap 16 has a second inner circumferential groove 19 which contains a wiper seal 21 for removing any foreign particles from the piston rod prior to its passing through the previously mentioned O-ring seal 18.

The pressure cap 16 covers the open end of a cylindrical housing 22 and is maintained in place by means of two screws 23, 24 inserted through openings in a lock plate 26 and threaded into the pressure cap 16. The lock plate 26 in turn is held in place by means of a lock-ring 27 engaging a semi-circular groove 28 in the inner wall of said cylindrical housing 22. To prevent operating fluid from escaping from the cylindrical housing 22, an O-ring seal 29 is fitted into an outer circumferential groove cut into the outer periphery of said pressure cap 16.

The cylinder formed by the cylindrical housing 22 and the pressure cap 16 is divided into first and second pressure chambers 34 and 36 by a main or actuator piston 32, which can be formed as an integral part of the piston rod 12. An O-ring seal 33 fitted into an outer groove on the periphery of the piston 32 pressure-seals the chambers 34, 36 from each other. The closed end of the cylindrical housing 22 includes a plurality of fluid connecting passages; one passage 31 connects a supply of operating fluid (not shown) to the pressure chamber 34, and a second fluid passage 38 opens into an unloading cylinder 39. Referring additionally to FIGURE 2, the unloading cylinder 39 includes a sleeve 41 and slider valve 42 assembled into a bore at the closed end 84 of the cylindrical housing 22. A hexagon shaped plug 44, threadably inserted into the cylindrical housing 22, holds the sleeve 41 and slider valve 42 in place to align the fluid passage 38 with openings in said sleeve. Two O-ring seals 46, 47 fitted into grooves in the slider valve 42 divide the unloading cylinder 39 into pressure chambers 48, 49 which will be discussed below.

At the closed end of the cylindrical housing 22 there is located a locking cylinder 51 having a locking cam 86 and an annular recess 52 toward the open end of said locking cylinder. Slidably positioned in the locking cylinder 51 is a locking piston 53 having a bore 54 through the center thereof (shown in FIGURE 1). A rod guide 56, threadably engaged with and therefore rigidly fixed to the cylindrical housing 22, extends through the bore 54 and thereby guides the locking piston 53 as it moves between an extended and a retracted position. A first O-ring seal 57, fitted into an outer groove on the locking piston 53, and a second O-ring seal 61, inserted into an inner groove on the piston 53, seal the pressure chamber 34 from the locking chamber 59. The piston 53 is biased to its fully extended position by means of a compression spring 63 mounted between the piston and the cylinder end 84. A dual lock nut arrangement 64, at the end of the guide rod 56, restricts the extended travel of the piston 53. The actuator shown in FIGURE 1 also includes a plurality of locking fingers 66 arranged in a cylindrical shape. The pendant ends of the fingers 66 are rigidly attached to the piston rod 12 so as to move with it.

In operation, for the actuator piston 32 to move to its retracted position, a pressure differential is established across the piston 32 by subjecting the chamber 36 to retract pressure through a typical selector valve, not shown. Assuming the piston 32 is moving from an extended position, i.e., moving from the left to the right in the various figures depicted in the drawing, a dog 80 on each finger 66 will initially bear against the annular inclined surface 86; continued movement of the piston 32 will cause the fingers to be deflected inwardly to a position such as that shown in FIGURE 6, where the fingers bear against a boss 82 on locking piston 53. Further movement of the piston 32 (to the right) causes the fingers 66 to push the locking piston 53 ahead of it toward the end wall 84. Eventually the locking fingers 66 of the actuator piston 32 force the piston 53 to its fully retracted position by compressing the spring 63. When the piston 53 has been pushed by the locking fingers 66 far enough away from the annular recess 52 so as to leave the recess unobstructed, the resilient fingers spread outwardly, causing the dog 80 on each of the fingers to enter the recess and thus lock the fingers (and the attached piston 32) to the cylindrical housing 22. When the actuator piston 32 is in its retracted position the selector valve, not shown, is typically placed in a neutral position, and the pressure differential across the piston 53 will be zero by operation of the slider valve 42, as will be explained hereinafter. The compression spring 63 constantly urges the piston 53 towards its fully extended position, thus helping to insure that the locking fingers 66 will be held in the recess 52.

To insure that the actuator piston 32 will be maintained in its fully retracted position, as shown in FIGURE 1, the two pressure chambers 34 and 36 are preferably opened to a reservoir (not shown). The pressure chamber 36 is connected to the reservoir by means of a fluid passage 37 which extends from the capped end of the cylindrical housing 22 to passage 38; passage 38 in turn is in communication with port 88. The pressure chamber 34 is connected to the reservoir by means of a fluid passage 31 which is in communication with port 89. Appropriate return lines (not shown) in turn connect the ports 88, 89 to the reservoir through the aforementioned selector valve. The chamber 59 of locking cylinder 51 is connected to port 88 and in turn to the reservoir by means of passageways in the slider valve 42 when the valve is in its retracted position, said passageways being shown in greater detail in FIGURE 2. Referring to FIGURE 2, with the actuator piston 32 in its fully retracted position, the slider valve 42 is forced to its fully retracted position by direct contact with the actuator piston 32. With the slider valve 42 fully retracted, a small annular chamber 71 in said slider valve is in communication with chambers 72, 73 of the sleeve 41, as shown in FIGURE 3. At the same time, the axial passage 74 remains open into the chamber 49, but the transverse passage 76 is sealed by the sleeve 41 as shown in FIGURE 5. The fluid connection from the locking chamber 59 to the reservoir, when the actuator piston 32 is fully retracted, is by means of passages 40, 73, 71, 72, and 38. Since both sides of the piston 53 are connected to the reservoir, a transient pressure change in the system will not inadvertently unlock the actuator piston 32.

To move the piston 32 to its fully extended position, the pressure chamber 34 is subjected to pressurized fluid through the aforementioned selector valve, while the pressure chamber 36 remains open to the reservoir return line. With the pressure chamber 34 connected to a source of fluid pressure, the pressure therein will become greater than that in the pressure chamber 36. In spite of the pressure differential initially established across the piston 32, it will be restrained from moving because the locking fingers 66 remain engaged with the annular detent 52. As described above, so long as the piston 32 remains in its fully retracted position, the pressure in the locking chamber 59 will be the same as that existing in chamber 36 and in the reservoir. Thus, by connecting the pressure chamber 34 to a source of operating fluid and chamber 59 to the reservoir, a differential pressure is developed across the piston 53 which eventually overcomes the force of the compression spring 63, and the piston 53 is moved to its retracted position. As the boss 82 on the piston 53 moves to the right past the annular recess 52, the locking fingers 66 are free to be extracted therefrom in response to the force exerted by fluid in chamber 34 acting on piston 32 which tends to pull fingers 66 to the left. Once the fingers 66 are pulled from the recess 52, the differential pressure developed across the piston 32 will cause said piston to continue to move until it reaches its extended position. Movement of the piston 32 to its extended position releases the slider valve 42, and it will be forced from the retracted position by the fluid pressure in the pressure chamber 49. Although both the front and back face of the slider valve 42 are exposed to the same pressure, positive movement of the slider valve is assured since the back of the slider valve has a larger surface area than the front. The fully extended position of the slider valve 42 is determined by the structural configuration of the sleeve 41.

Referring to FIGURE 6, the slider valve 42 is shown in its fully extended position. In this position, the pressure in the locking chamber 59 is equal to the pressure in the chamber 34 since the transverse passage 76, of the slider valve 42, lines up with the second passage of the chamber 73, as shown in FIGURE 9. The annular passage 71 that previously provided communication between the locking chamber 59 and the reservoir, when the piston 32 was in its locked position, is now sealed off as shown in FIGURE 7. Also, the chamber 72 is isolated from the chamber 73 by the slider valve 42, as shown in FIGURE 8.

To retract the piston 32 from its fully extended position, the pressure chamber 34 is opened to the return line and the pressure chamber 36 is connected to a source of fluid pressure by means of the aforementioned selector valve. A pressure differential is thus developed across the piston 32 which causes it to move to the right toward its fully retracted position. Since the locking chamber 59 is connected to the pressure chamber 34 by means of passages in the slider valve 42 and sleeve 41, and passage 40, the pressure differential across the piston 53 will remain zero during this operation. Accordingly, when the piston 32 approaches its fully retracted position and the locking fingers 66 engage the piston 53, the fingers do not have to work against any fluid pressure behind the piston 53, i.e., they work only against the force of the compression spring 63. After the locking fingers 66 make contact with the piston 53, the piston 32 engages the slider valve 42, thereby forcing it to its retracted position. By examination of the spacing of the passages in slider valve 42, as best shown in FIGURE 6, it will be apparent that high pressure fluid from passage 38 is not placed in communication with chamber 59 (through annular chamber 71) until dog 80 is securely locked in place in recess 52.

One particularly advantageous feature of this invention is that the slider valve 42 has positive movement to both its extended and retracted positions. Retraction of a slider valve 42 is by the force developed by a pressure differential across the piston 32, and transmitted to the slider valve by direct physical contact; and extension of the slider valve is by means of the forces generated by equal pressures being applied to different size areas at the front and back of the slider valve.

While only one embodiment of the invention has been described in detail herein and shown in the accompanying drawing, it will be evident that various modifications are possible in the arrangement and construction of its components without departing from the scope of the invention.

I claim:
1. A hydraulic actuator, comprising:
a housing having a cylinder therein;
an actuator piston dividing the cylinder into first and second chambers and movable within said cylinder between an extended position and a retracted position;
a locking cam mounted in said cylinder adjacent said retracted position;
finger means carried by said actuator piston and retainingly engageable with said locking cam when said actuator piston is in said retracted position;
a locking piston movable between a finger-engaging position and a retracted position, said locking piston sealingly separating the cylinder first chamber from a locking chamber, said locking piston having equal effective areas in communication respectively with said first chamber and said locking chamber;
resilient means urging said locking piston toward a finger-engaging position so as to facilitate retention of said finger means in locking engagement with said locking cam;
passages in said housing adapted to provide communication between each side of the locking piston; and
means for supplying fluid pressure within said locking chamber so as to control the position of the locking piston and thereby selectively retain said finger means in locking engagement with said locking cam, said means including a slider valve having passages which cooperate with the aforementioned housing passages to place the cylinder second chamber in open communication with the locking chamber when the locking piston is in its locking position, whereby a pressure surge in the fluid surrounding the locking piston in its locking position acts equally on both sides of said piston such that said piston is immune to said pressure surge, and said slider valve further having passages which cooperate with the aforementioned housing passages to place the cylinder first chamber in open communication with the locking chamber when the actuator is in its extended position.

2. The hydraulic actuator claimed in claim 1 wherein a chamber normally containing fluid which, when pressurized, serves to urge the slider valve from a retracted position to an extended position is always in communication with the cylinder first chamber, such that pressurized fluid which urges the actuator piston to its extended position also urges the slider valve to its extended position.

3. The hydraulic actuator claimed in claim 2 wherein the slider valve is physically blocked from moving from its retracted position to its extended position by the actuator piston when the actuator piston is fully retracted.

References Cited

UNITED STATES PATENTS

| | | | |
|---|---|---|---|
| 629,822 | 8/1899 | Shelburne | 91—341 X |
| 643,467 | 2/1900 | Carpenter et al. | 91—341 |
| 1,181,058 | 4/1916 | Bashaw | 91—341 X |
| 1,709,682 | 4/1929 | Moxley | 91—341 X |
| 2,576,554 | 11/1951 | Ashton | 91—45 |
| 3,176,590 | 4/1965 | Uhtenwoldt et al. | 91—45 |
| 2,685,275 | 8/1954 | Caldwell | 92—26 |
| 3,107,582 | 10/1963 | Royster | 92—24 |
| 3,108,513 | 10/1963 | Koshobu | 92—27 X |
| 3,135,172 | 6/1964 | Messerschmitt | 92—26 |
| 3,228,307 | 1/1966 | Dillard | 92—26 |
| 3,315,568 | 4/1967 | Fredd | 92—27 X |

MARTIN P. SCHWADRON, Primary Examiner

IRWIN C. COHEN, Assistant Examiner

U.S. Cl. X.R.

91—41